United States Patent
Suhir

(10) Patent No.: US 6,314,218 B1
(45) Date of Patent: Nov. 6, 2001

(54) METHOD OF IMPROVING THE PERFORMANCE OF OPTICAL FIBER WHICH IS INTERCONNECTED BETWEEN TWO MISALIGNED SUPPORTS

(75) Inventor: Ephraim Suhir, Randolph, NJ (US)

(73) Assignee: Agere Systems Optoelectronics Guardian Corp., Allentown, PA (US)

( * ) Notice: Subject to any disclaimer, the term of this patent is extended or adjusted under 35 U.S.C. 154(b) by 0 days.

(21) Appl. No.: 09/211,726

(22) Filed: Dec. 14, 1998

(51) Int. Cl.$^7$ ................ G02B 6/26; G02B 6/42
(52) U.S. Cl. .............. 385/31; 385/88; 385/140; 359/179; 359/341
(58) Field of Search ............... 385/60–68, 78, 385/147, 95–99, 88–94, 140, 52, 31; 359/341, 179

(56) References Cited

U.S. PATENT DOCUMENTS 5,351,327 * 9/1994 Lurie et al. ................ 385/78
5,682,451 * 10/1997 Lee et al. ................... 385/78

OTHER PUBLICATIONS

Barnoski et al., "Fundamentals of Optical Fiber Communications," N.Y., Academic Press, 1981, pp. 75–78, 173–175, 225, 295–307.*
Keiser, "Optical Fiber Communications," N.Y., McGraw-Hill, 1983, p. 141.*
Kapron et al., "Radiation Losses in Glass Optical Waveguides," Appl. Phys. Lett., vol. 17, pp. 423–5, 1970.*

* cited by examiner

Primary Examiner—Frank G. Font
Assistant Examiner—Michael P. Mooney
(74) Attorney, Agent, or Firm—Schnader Harrison Segal & Lewis LLP

(57) ABSTRACT

A method of improving the performance of optical fiber which is interconnected between a first point of support on a first device in a piece of equipment and a second point of support in a second device in said piece of equipment comprising:

a. determining the axis of said piece of equipment through said first point of support; a first line through said first point of support and perpendicular to said axis; a second line through said second point of support and perpendicular to said axis; the interconnect span, $l$, along said axis between said first point of support and said second perpendicular line; the lateral misalignment, $\Delta$, between said axis and said second point of support along said second perpendicular line; the angular misalignment, $\alpha$, of said first device in a counterclockwise direction versus said first perpendicular line; and the angular misalignment, $\beta$, of said second device in a clockwise direction versus said second perpendicular line;

b. determining the ideal angle of rotation $\bar{\alpha}$ for said first device and the ideal angle of rotation $\bar{\beta}$ for said second device according to the formula $$\bar{\alpha} = -\alpha + \frac{\Delta}{l}, \bar{\beta} = -\beta - \frac{\Delta}{l},$$

and c. rotating said first device toward said $\bar{\alpha}$, and or rotating said second device toward said $\bar{\beta}$.

12 Claims, 3 Drawing Sheets

METHOD OF IMPROVING THE PERFORMANCE OF OPTICAL FIBER WHICH IS INTERCONNECTED BETWEEN TWO MISALIGNED SUPPORTS

BACKGROUND OF THE INVENTION

1. Field of the Invention

The present invention is directed to optical fiber interconnect technology.

2. Description of the Prior Art

Modern microelectronic and photonic equipment utilizes optical fibers to connect devices. Such equipment includes amplifiers, repeaters, attenuators, laser sources, and a wide variety of other types of photonis and optoelectronic devices, usually assembled in subassemblies or assemblies. Optical fiber interconnects between two devices in a piece of equipment, or assembly or subassembly, are often subject to ends misalignment. The misalignment can be lateral or angular, or both. The misalignments are typically due to the inherent inaccuracies of manufacturing technology in producing a straight interconnect, but can be caused also by a manufacturing error, or can be an essential feature of a product design. Misalignments such as these cause reduced optical performance, reduced mechanical performance due to static fatigue, or both.

The mechanical behavior of optical fiber interconnects experiencing end misalignments is the subject of extensive research, as embodied by a number of publications. Examples are: Suhir, E., "The Future of Microelectronics and Photonics, and the Role of Mechanics and Materials", ASME Journal of Electronic Packaging, Mar. 1998; Suhir, E., "Structural Analysis in Fiber Optics", in Menon, ed., "Trends in Lightwave Technology", Council of Scientific Information, India, 1995; Suhir, E., "Structural Analysis in Microelectronic and Fiber Optic Systems", Van-Nostrand Reinhold, N. Y., 1991; Suhir, E., "Predicted Curvature and Stresses in an Optical Fiber Interconnect Subjected to Bending", IEEE/OSA Journal of Lightwave Technology, Vol.14, No.2, 1996; Suhir E., "Input/Output Fiber Configuration in a Laser Package Design", ASME Journal of Electronic Packaging, vol.117, No.4, 1995; Suhir, E., "Bending Performance of Clamped Optical Fibers: Stresses due to the Ends Off-Set", Applied Optics, Vol.28, No.3, 1989; Suhir, E., "Optical Fiber Interconnect Subjected to a Not-Very-Small Ends Off-Set", MRS Symposia Proceedings, vol. 531, 1998; Suhir, E., "Predicted Bending Stresses in an Optical Fiber Interconnect Experiencing Significant Ends Off-Set", MRS Symposia Proceedings, vol. 531, 1998; Suhir, E., Kurkjian, C. R., and M. Fukuda, "Reliability of Photonics Materials and Structures", MRS Symposia Proceedings, vol. 531, 1998; Suhir, E., "Stresses in Dual-Coated Optical Fibers", ASME Journal of Applied Mechanics, Vol.55, No. 10, 1988; and Suhir, E., "Bending of a Partially Coated Optical Fiber Subjected to the Ends Off-Set", IEEE/OSA Journal of Lightwave Technology, Vol. 12, No.2, 1997.

Although stress and reduced optical performance of optical fiber interconnects between supports on two devices has been recognized in the art, to date no one has proposed a solution to this problem.

SUMMARY OF THE INVENTION

In one aspect, the invention comprises a method of improving the performance of optical fiber which is interconnected between a first point of support on a first device in a piece of equipment and a second point of support in a second device in said piece of equipment comprising:

a. determining the axis of said piece of equipment through said first point of support; a first line through said first point of support and perpendicular to said axis; a second line through said second point of support and perpendicular to said axis; the interconnect span, $l$ along said axis between said first point of support and said second perpendicular line; the lateral misalignment, $\Delta$, between said axis and said second point of support along said second perpendicular line; the angular misalignment, $\alpha$, of said first device in a counterclockwise direction versus said first perpendicular line; and the angular misalignment, $\beta$, of said second device in a clockwise direction versus said second perpendicular line;

b. determining the ideal angle of rotation $\bar{\alpha}$ for said first device and the ideal angle of rotation $\bar{\beta}$ for said second device according to the formula $$\bar{\alpha} = -\alpha + \frac{\Delta}{l}, \bar{\beta} = -\beta - \frac{\Delta}{l},$$

and c. rotating said first device toward said $\bar{\alpha}$, and/or rotating said second device toward said $\bar{\alpha}$.

DETAILED DESCRIPTION

The present invention will be understood more fully from the detailed description given below and from accompanying drawings of preferred embodiments of the invention, which, however, should not be taken to limit the invention to a specific embodiment, but are for explanation and understanding only.

Figure 1:
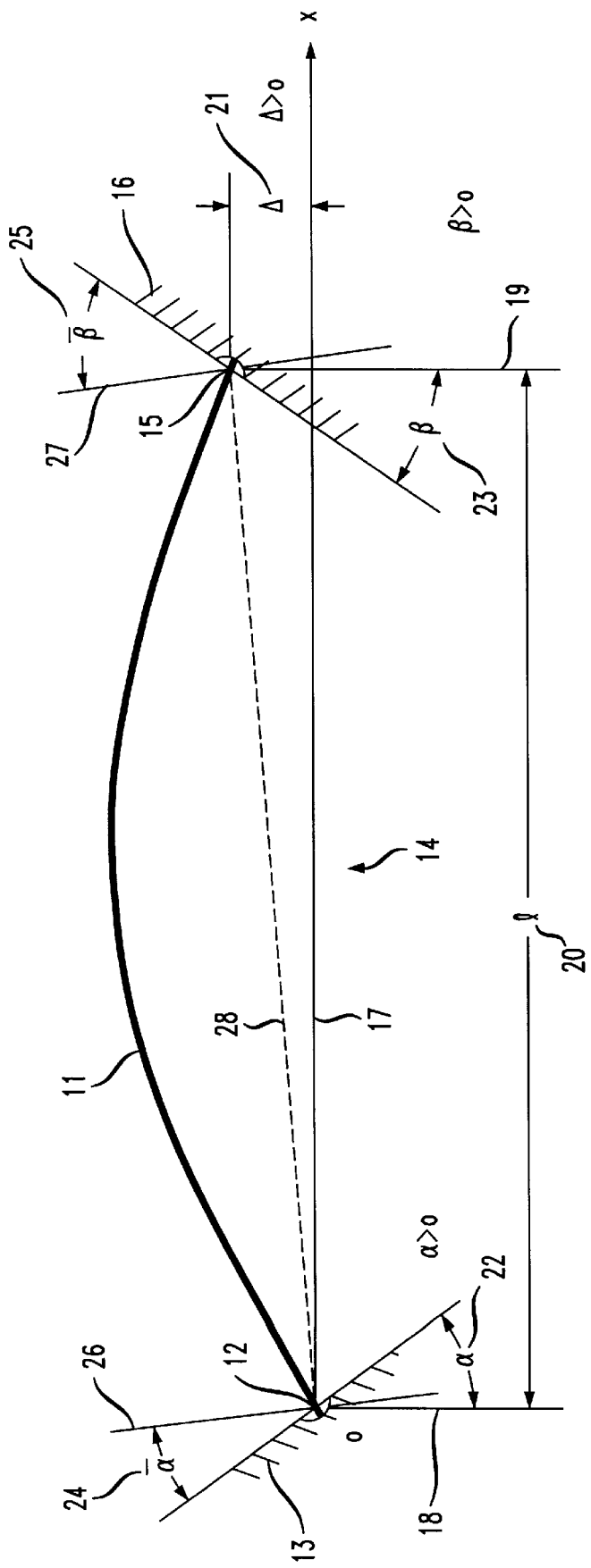
FIG. 1 is an elevated cross-sectional view of an optical fiber connecting two devices, wherein the optical fiber is misaligned.

Referring first to FIG. 1, a piece of equipment 14 is shown as having a first device 13 (only section of device adjacent to fiber is illustrated) and a second device 16. Types of pieces of equipment to which this invention is most applicable are optical or electronic assemblies or subassemblies comprised of two or more devices. Many different types of microelectronic and photonic devices can be included in such types of equipment. Typical devices which are included in such equipment are amplifiers, repeaters, attenuators, laser sources, electronic packages, and photonic packages. Such devices generally comprise a capillary, ferrule, or other type optical fiber mounting means. Whether a capillary, ferrule, or other means is used, the optical fiber is typically mounted at a right angle to the surface of the device and adhered either by welding or adhesive, or by pressure.

Optical fiber in original position 11 is mounted between a first point of support 12 in or on the first device 13 and a second point of support 15 in or on the second device 16. The two points of support are the joints, typically solder joints or epoxy bonded joints, between the optical fiber and the devices.

In manufacturing such pieces of equipment, the devices are frequently placed so that the ends of the optical fiber are "misaligned." Sometimes the design of the equipment requires such misalignment, and at other times manufacturing tolerances inherently result in such misalignment. The misalignment cause reduced performance of, and mechanical stress on, the optical fiber. This invention provides a method for reducing or eliminating such misalignment, resulting in improved performance of the fiber and thereby improving the performance of the equipment.

According to the method of the invention, the axis 17 of the equipment is determined, and a first line 18 through said first point of support 12 and perpendicular to the axis is also determined. A second line 19 through the second point of support and perpendicular to the axis is also determined. The interconnect span (*l*) 20 is determined. The lateral misalignment (Δ) 21 between the axis and the second point of support along the second perpendicular line is also determined. These points and lines can be measured in any of several different ways; for example, a camera with 50× to 100× magnification can be used to take a picture, and the picture can be measured with very close tolerances. Alternatively, a toolmakers microscope, for example the type made by Nikon, can be use to measure laterally to tolerances as small as 1 micron, and angularly as close as 5 minutes The angular misalignment (α) 22 of the first device in a counterclockwise direction versus the first perpendicular line and the angular misalignment (β) 23 of the second device in a clockwise direction versus the second perpendicular line are determined.

According to the invention, the ideal angle of rotation $\bar{\alpha}$ 24 for the first device and the ideal angle of rotation $\bar{\beta}$ 25 for the second device are calculated according to the formula $$\bar{\alpha} = -\alpha + \frac{\Delta}{l}, \bar{\beta} = -\beta - \frac{\Delta}{l},$$

when *l*>>Δ, and then the devices are rotated in the direction of their respective the ideal angles of rotation as close as possible to the ideal new positions, 26 and 27, respectively. In some cases, it is not possible, convenient, or cost effective to completely correct the misalignments determined by this method, and in such cases the invention comprises rotating either or both devices partially in the direction up to their respective ideal angle(s) of rotation. When it is possible, convenient, and cost effective to do so, however, the devices should be rotated as much as possible to the ideal angles of rotation calculated as described above, resulting in new position 26 of the first device and new position 27 of the second device, and in new optical fiber position 28, which is improved from original optical fiber position 11 in that the new position results in reduced stress and static fatigue, and improved optical performance.

Figure 2:
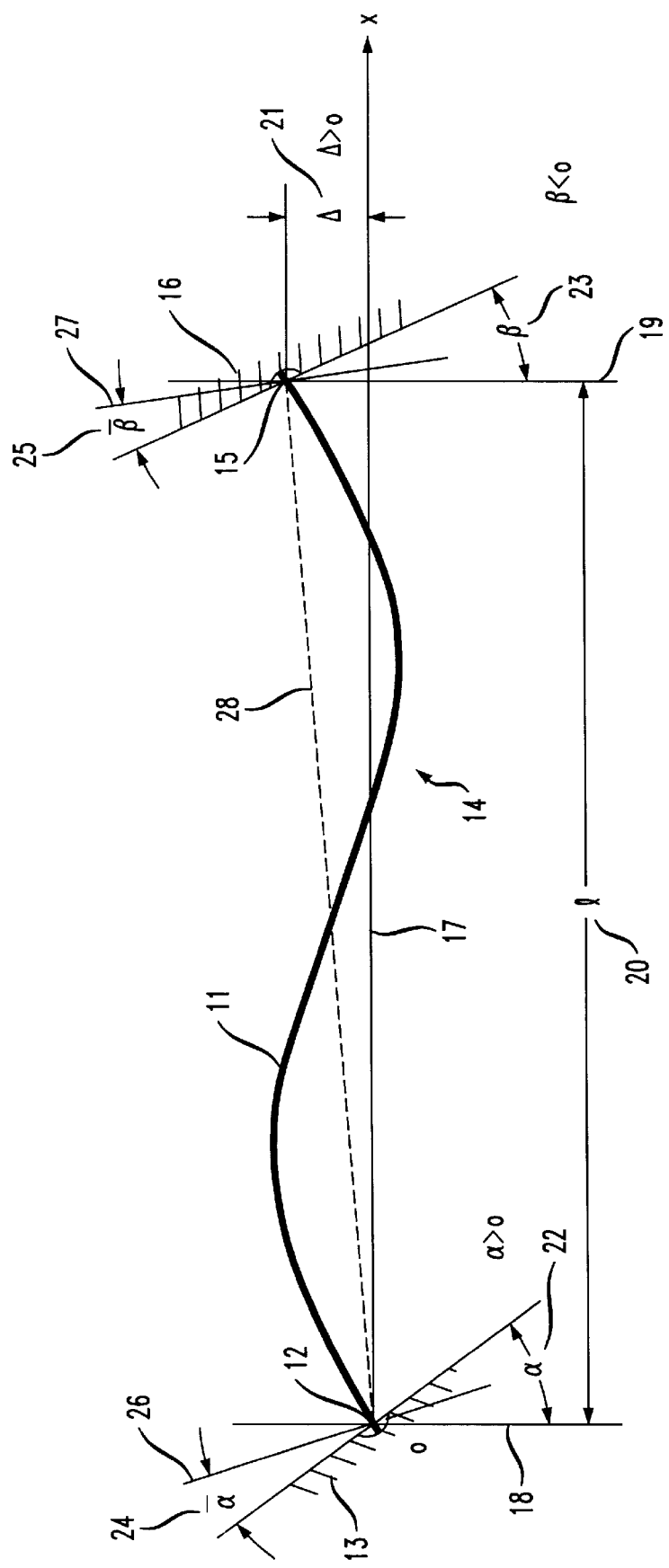
FIG. 2 is an elevated cross-sectional view of an optical fiber connecting two devices showing a second type of misalignment.
Figure 3:
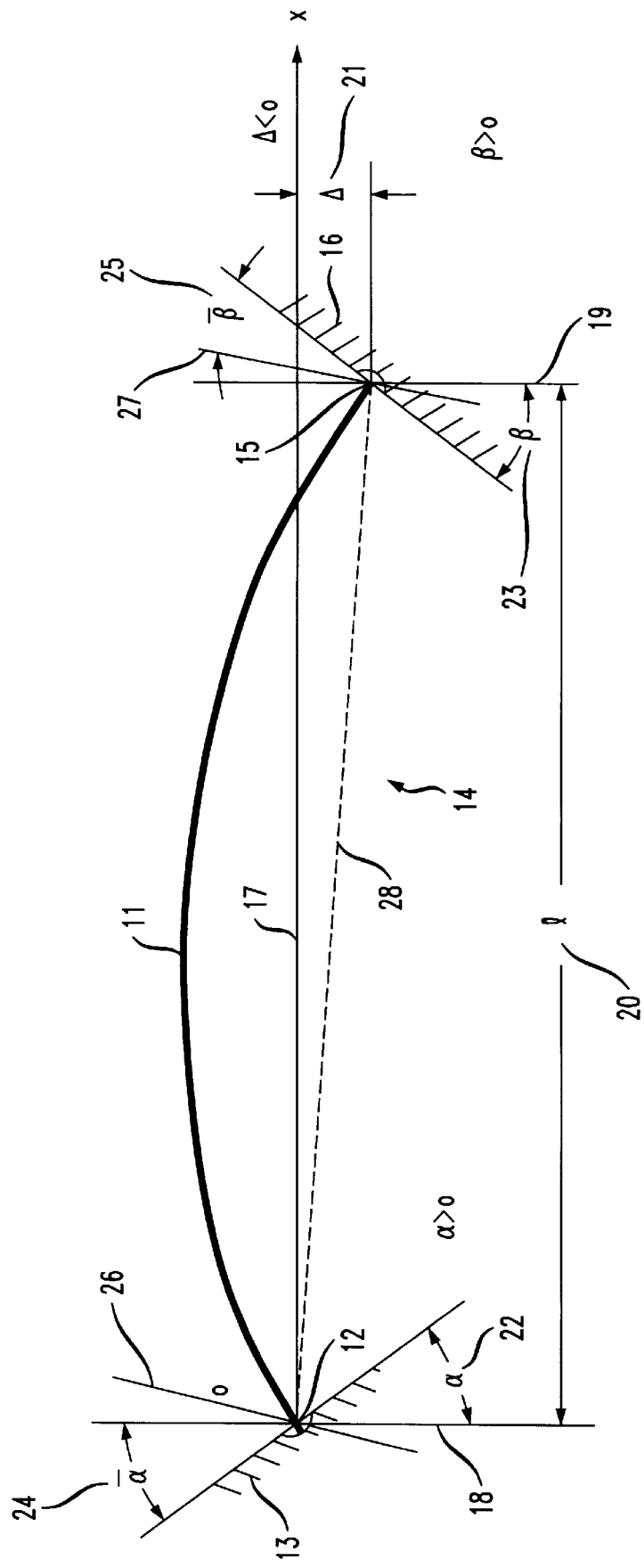
FIG. 3 is an elevated cross-sectional view of an optical fiber connecting two devices showing a third type of misalignment.

Referring to FIGS. 2 and 3, the same apparatus is shown with the same first device 13, second device 16, first point of support 12, second point of support 15, and an optical fiber in original position 11. These figures show different misalignments which can occur because of manufacturing unpredictability. The same method described with respect to FIG. 1 is used to determine the angles of rotation $\bar{\alpha}$ and $\bar{\beta}$ which will be used to compensate for both the angular and lateral misalignments shown in FIGS. 2 and 3.

The supports on the devices can be rotated by any known means, for example using a tweezers, or manually. More accurate mechanical or optical alignment methods are also envisioned, for example using a digitally controlled table which is piezo electric transducer driven, in conjunction with a clamping device or using epoxy bonding. When using epoxy bonding, it is preferred to incompletely cure the epoxy, or to use heat to remove the clamping device.

While this invention has been described in conjunction with specific embodiments thereof, it is evident that many alternatives, modifications, and variations will be apparent to those skilled in the art. Accordingly, the preferred embodiments of the invention set forth herein are intended to be illustrative, not limiting. Various changes may be made without departing from the spirit and scope of the invention as defined in the appended claims.

What is claimed is:

1. A method of improving the performance of optical fiber which is interconnected between a first point of support on a first device in a piece of equipment and a second point of support in a second device in said piece of equipment comprising:

a. determining the axis of said piece of equipment through said first point of support; a first line through said first point of support and perpendicular to said axis; a second line through said second point of support and perpendicular to said axis; the interconnect span, *l*; along said axis between said first point of support and said second perpendicular line; the lateral misalignment, Δ, between said axis and said second point of support along said second perpendicular line; the angular misalignment, α, of said first device in a counterclockwise direction versus said first perpendicular line; and the angular misalignment, β, of said second device in a clockwise direction versus said second perpendicular line;

b. determining the ideal angle of rotation $\bar{\alpha}$ for said first device and the ideal angle of rotation $\bar{\beta}$ for said second device according to the formula $$\bar{\alpha} = -\alpha + \frac{\Delta}{l}, \bar{\beta} = -\beta - \frac{\Delta}{l},$$

and c. rotating said first device toward said $\bar{\alpha}$, and/or rotating said second device toward said $\bar{\beta}$.

2. Method according to claim 1 wherein said two points of support are solder joints or epoxy bonded joints between said optical fiber and said devices.

3. Method according to claim 1 wherein said supports are rotated manually.

4. Method according to claim 1 wherein said equipment is an assembly or subassembly comprised of two or more devices, said devices being optical or electronic.

5. Method according to claim 1 wherein said devices are selected from the group consisting of amplifiers, repeaters, attenuators, laser sources, electronic packages, and photonic packages.

6. Method according to claim 1 wherein said first device is rotated to $\bar{\alpha}$.

7. Method according to claim 1 wherein said second device is rotated to $\bar{\beta}$.

8. Method according to claim 1 wherein said first device is rotated to $\bar{\alpha}$ and said second device is rotated to $\bar{\beta}$.

9. Article comprising at least two microelectronic or photonic devices connected by optical fiber which has been adjusted after initial manufacture by the method of claim 1.

10. Article according to claim 9 in the form of an electronic assembly or subassembly.

11. Article according to claim 9 wherein said devices are selected from the group consisting of amplifiers, repeaters, attenuators, laser sources, electronic packages, and photonic packages.

12. Article according to claim 9 wherein said first device is rotated to $\bar{\alpha}$ and/or said second device is rotated to $\bar{\beta}$.

* * * * *